United States Patent
Inagaki

(10) Patent No.: US 7,833,678 B2
(45) Date of Patent: Nov. 16, 2010

(54) FUEL CELL STACK

(75) Inventor: Toshiyuki Inagaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1270 days.

(21) Appl. No.: 11/206,839

(22) Filed: Aug. 19, 2005

(65) Prior Publication Data

US 2005/0277012 A1    Dec. 15, 2005

Related U.S. Application Data

(63) Continuation of application No. PCT/JP03/16020, filed on Dec. 15, 2003.

(30) Foreign Application Priority Data

Mar. 6, 2003    (JP) .............................. 2003-059618
Nov. 20, 2003    (JP) .............................. 2003-390629

(51) Int. Cl.
   *H01M 2/08*    (2006.01)
   *H01M 2/14*    (2006.01)
(52) U.S. Cl. ........................ 429/511; 429/467; 429/469; 429/470; 429/471; 429/508
(58) Field of Classification Search ................... 429/18, 429/34, 37, 467, 469, 470, 471, 508, 511
   See application file for complete search history.

(56) References Cited

U.S. PATENT DOCUMENTS

| | | |
|---|---|---|
| 4,431,714 A | 2/1984 | Myerhoff |
| 4,689,280 A | 8/1987 | Gionfriddo |
| 5,547,777 A | 8/1996 | Richards |
| 5,686,200 A | 11/1997 | Barton et al. |
| 6,210,823 B1 | 4/2001 | Hatoh et al. |
| 6,270,917 B1 | 8/2001 | Maeda et al. |
| 6,613,470 B1 | 9/2003 | Sugita et al. |
| 6,645,659 B2 | 11/2003 | Bisaka et al. |
| 6,855,448 B2 | 2/2005 | Kikuchi et al. |
| 2002/0034672 A1 | 3/2002 | Saito et al. |
| 2002/0034673 A1* | 3/2002 | Bisaka et al. ................ 429/37 |

FOREIGN PATENT DOCUMENTS

| | | |
|---|---|---|
| DE | 100 41 532 A1 | 3/2001 |
| DE | 102 13 558 A1 | 11/2002 |

(Continued)

*Primary Examiner*—Patrick Ryan
*Assistant Examiner*—Ben Lewis
(74) *Attorney, Agent, or Firm*—Oblon, Spivak, McClelland, Maier & Neustadt, L.L.P.

(57) ABSTRACT

A spring module is mounted to a fuel cell stack. The spring module includes a first member and a second member capable of inclining relative to each other and moving in a direction toward and away from each other, and a plurality of springs independent of each other and disposed in parallel with each other between the first and second members. The spring module is disposed between an end plate and the pile of fuel cells. The first member includes a first casing, and the second member includes a second casing, whereby the sparing module includes a casing assembly housing the springs. The bottom surface of the casings is deformable to be wavy. The spring module may include a shock absorber. The plurality of springs may include a coil spring and a sponge of a low-resilience type.

20 Claims, 8 Drawing Sheets

FOREIGN PATENT DOCUMENTS

| | | |
|---|---|---|
| EP | 1 445 815 B1 | 8/2004 |
| EP | 1 601 041 | 11/2005 |
| JP | 58-115772 | 7/1983 |
| JP | 61-39373 | 2/1986 |
| JP | 61-248368 | 11/1986 |
| JP | 62-31942 | 2/1987 |
| JP | 62-165874 | 7/1987 |
| JP | 62-271364 | 11/1987 |
| JP | 1-281681 | 11/1989 |
| JP | 2-220364 | 9/1990 |
| JP | 08-045535 | 2/1996 |
| JP | 08-088018 | 4/1996 |
| JP | 08-115737 | 5/1996 |
| JP | 9-115531 | 5/1997 |
| JP | 9-289027 | 11/1997 |
| JP | 10-32015 | 2/1998 |
| JP | 10-228918 | 8/1998 |
| JP | 11-007975 | 1/1999 |
| JP | 11-097054 | 4/1999 |
| JP | 2000-113896 | 4/2000 |
| JP | 2002-124291 | 4/2002 |
| JP | 2002-260708 | 9/2002 |
| JP | 2002-302785 | 10/2002 |

* cited by examiner

FUEL CELL STACK

CROSS-REFERENCE TO RELATED APPLICATIONS

This application is a continuation and claims the benefit under 35 U.S.C. §119 of the earliest filing date of International Application No. PCT/JP2003/016020 filed on Dec. 15, 2003, which is hereby incorporated by reference in its entirety.

BACKGROUND OF THE INVENTION

1. Field of the Invention

The present invention generally relates to a fuel cell stack. More specifically, the present invention relates to a fuel cell stack wherein a method for affording a fastening load to a fuel cell stack is improved.

2. Background of the Invention

When stacking fuel cells, a fastening load of a fuel cell stack has to be uniform over an entire range of a transverse cross section of an electrode portion of a stack in order to decrease electrode contact resistance and seal gas and water. Moreover, the fastening load must not vary substantially.

For example, even if a fuel cell surface is inclined because of a variance in a thickness of a separator, which variance may be caused by the manufacture of the separator, the fastening load of the fuel cell stack must be uniform over the entire range of the fuel cell surface. Further, a temperature of the fuel cell may repeatedly change between an environmental temperature when operation is stopped (e.g., 20° C.) and a temperature of cooling water during operation (about 80° C.), and the fastening load of the fuel cell stack may change because of the fuel cell temperature changes. Furthermore, the fastening load of the fuel stack will also change because of a creep of an electrolyte membrane and electrodes after a long period of time. However, such load changing factors must be absorbed and the fastening load of the fuel cell stack must not vary substantially.

Japanese Patent Publication HEI 8-115737 discloses a fastening structure of a fuel cell stack where, in order to uniformly fasten the fuel cell stack, a single integral elastic resilient member is disposed at a central position between a first rigid fastening plate of a first size located at a first end of the fuel cell stack and a second rigid fastening plate of a second size smaller than the first size located at the first end of the fuel cell stack, and at four corners of the second fastening plate, the second fastening plate located at the first end of the fuel cell stack and the first fastening plate located at a second, opposite end of the fuel cell stack are fastened by a bolt and nut extending in a fuel cell piling direction.

However, the above-described fastening structure of the fuel cell stack presents the following problems:

First, although the fastening structure can follow an inclination of an end surface of the pile of the fuel cells by inclining the fastening plate after deformation of the resilient member, the fastening plate cannot follow a wavy deformation of the end surface of the pile of the fuel cells because the fastening plate is a rigid plate.

Second, since the second fastening plate located at the first end of the fuel cell stack and the first fastening plate located at a second, opposite end of the fuel cell stack are fastened by a bolt extending in a fuel cell piling direction and since the bolt is not elongated, the fastening structure cannot follow a change in a length of the pile of fuel cells in the fuel cell piling direction. Therefore, the fastening structure cannot follow a thermal expansion of the pile of fuel cells nor can the fastening structure absorb a change in a load in the fuel cell piling direction resulting from a creep of the electrolyte membrane and the electrodes.

SUMMARY OF THE INVENTION

An object of the present invention is to address the aforementioned problems by providing a fuel cell stack which can follow not only an inclination of an end surface of the pile of fuel cells, but also a change of a length of the pile of fuel cells in the fuel cell piling direction.

Another object of the present invention is to address the aforementioned problems by providing a fuel cell stack which can make a fastening load uniform over an entire range of the fuel cell plane and can decrease alteration of the load in the fuel cell piling direction.

According to a first embodiment of the present invention, there is provided a fuel cell stack including a pile of fuel cells and a spring module disposed in series with the pile of fuel cells; and the spring module includes a first member and a second member, capable of inclining relative to each other and moving in a direction toward and away from each other, and a plurality of springs independent of each other and disposed in parallel with each other between the first member and the second member.

According to a second embodiment of the present invention, there is provided a fuel cell stack according to the first embodiment above, wherein the fuel cell stack includes an end plate and an adjust screw; the spring module is disposed between the end plate and the pile of fuel cells; and the adjust screw is disposed between the spring module and the end plate.

According to a third embodiment of the present invention, there is provided a fuel cell stack according to the first embodiment above, wherein the first member includes a first casing and the second member includes a second casing; and the spring module includes a casing assembly housing the plurality of springs therein.

According to a third embodiment of the present invention, there is provided a fuel cell stack according to the third embodiment above, wherein a casing among the first and second casings located closer to the pile of fuel cells includes a bottom wall having such a rigidity that when the wall is pushed by the plurality of springs independent of each other, the wall is deformed in a fuel cell piling direction in which the fuel cells are piled, to be deformed in a form of a wave.

According to a fifth embodiment of the present invention, there is provided a fuel cell stack according to the third embodiment above, wherein the spring module includes a plurality of spring seat members; and each of the plurality of spring seat members has an end portion which extends through an aperture formed in the wall of the casing located closer to the pile of fuel cells and contacts a member contacting the wall of the casing.

According to a sixth embodiment of the present invention, there is provided a fuel cell stack according to the fifth embodiment above, wherein the end portion of each of the plurality of spring seat members has an end surface which is convexly curved.

According to a seventh embodiment of the present invention, there is provided a fuel cell stack according to the third embodiment above, wherein the first and second casings of the spring module have a side wall where a load expressing portion is provided.

According to an eighth embodiment of the present invention, there is provided a fuel cell stack according to either the first or the third embodiment above, wherein the spring module is disposed at an intermediate portion of the pile of fuel cells in a fuel cell piling direction in which the fuel cells are piled.

According to a ninth embodiment of the present invention, there is provided a fuel cell stack according to the eighth embodiment above, wherein the first member and the second member are electrically connected to each other by an electrically conductive member other than the plurality of springs.

According to a tenth embodiment of the present invention, there is provided a fuel cell stack according to either the first or the third embodiment above, wherein the spring module is disposed at each of opposite ends of the fuel cell stack in a fuel cell piling direction in which the fuel cells are piled.

According to an eleventh embodiment of the present invention, there is provided a fuel cell stack according to either the first or the third embodiment above, wherein the spring module further includes a shock absorber located between the first member and the second member.

According to a twelfth embodiment of the present invention, there is provided a fuel cell stack according to either the first or the third embodiment above, wherein the spring module further includes a plurality of shock absorbers; and each of the plurality of shock absorbers and each of the plurality of springs are coaxially arranged with each other.

According to a thirteenth embodiment of the present invention, there is provided a fuel cell stack according to the first embodiment above, wherein the spring module includes a plurality of types of resilient members having moduli of elasticity different from each other.

According to a fourteenth embodiment of the present invention, there is provided a fuel cell stack according to the thirteenth embodiment above, wherein the plurality of types of resilient members are disposed parallel to each other.

According to a fifteenth embodiment of the present invention, there is provided a fuel cell stack according to the thirteenth embodiment above, wherein one type of resilient members among the plurality of types of resilient members hold another type of resilient members among the plurality of types of resilient members.

According to a sixteenth embodiment of the present invention, there is provided a fuel cell stack according to either the thirteenth or the fourteenth embodiment above, wherein the plurality of types of resilient members are formed so as to be integral with each other.

According to a seventeenth embodiment of the present invention, there is provided a fuel cell stack according to the thirteenth embodiment above, wherein one type of resilient members among the plurality of types of resilient members has a spring constant changing in magnitude corresponding to a speed of deformation and a spring constant corresponding to a high speed of deformation is greater than a spring constant corresponding to a slow speed of deformation.

According to a eighteenth embodiment of the present invention, there is provided a fuel cell stack according to the thirteenth embodiment above, wherein the plurality of types of resilient members includes a spring type and a low-resilience sponge type.

According to a nineteenth embodiment of the present invention, there is provided a fuel cell stack according to the thirteenth embodiment above, wherein the plurality of types of resilient members comprises types of resilient members combined such that the spring module presents a load versus deformation characteristic bending at an intermediate deformation point in a full deformation range.

According to a twentieth embodiment of the present invention, there is provided a fuel cell stack according to the thirteenth embodiment above, wherein the spring module has a low spring constant; and the spring module is precompressed or is used at a large deformation range.

According to a twenty-first embodiment of the present invention, there is provided a fuel cell stack according to the first embodiment above, wherein the resilient member and the first and second members are made from corrosion-resistant materials.

Technical Advantages of the Present Invention

In the fuel cell stack according to the first embodiment above, since the plurality of springs can be deformed independently of each other, the plurality of springs can follow not only an inclination of an end surface and a wavy deformation of the inclined end surface of the pile of fuel cells, but also a change of a length of the pile of fuel cells in the fuel cell piling direction. As a result, the fastening load is made uniform over an entire range of the fuel cell plane. Further, alteration of the load in the fuel cell piling direction can be decreased.

In the fuel cell stack according to the second embodiment above, when compared with a structure such as that illustrated in FIG. 20 wherein a layered assembly of a plurality of coned disk springs, a spherical seat member containing a load cell, and an adjust screw are disposed between an end plate and a pile of fuel cells, the spherical seat member containing a load cell and the layered assembly of a plurality of coned disk springs can be removed.

In the fuel cell stack according to the third embodiment above, it is easy to mount the spring module to the fuel cell stack since the spring module is made in the form of a casing assembly.

In the fuel cell stack according to the fourth embodiment above, the load loaded on the pile of fuel cells from the spring module can be made more uniform over the entire fuel cell surface, since the bottom wall of the casing can be deformed to be wavy, than in the case of Japanese Patent Publication HEI 8-115737 wherein the load is loaded on the pile of fuel cells from the rigid plate.

In the fuel cell stack according to the fifth embodiment above, since the end portion of the spring seat member extends through the aperture formed in the wall of the casing, the spring can follow the wavy, convex, and concave deformation of the end surface of the member which contacts the spring module plane-to-plane, so that a fastening load is made uniform over an entire range of the fuel cell surface.

In the fuel cell stack according to the sixth embodiment above, since the end surface of the spring seat member is convexly curved by constructing the spring seat member from a ball, for example, even if a transverse load (a load directed in a direction perpendicular to the fuel cell piling direction) is loaded on the spring module from the member which contacts the spring module plane-to-plane, the spring seat can easily release the transverse load by rotating.

In the fuel cell stack according to the seventh embodiment above, it is unnecessary to provide a load cell in the present invention since the load expressing portion is provided in the side wall of the casing.

In the fuel cell stack according to the eighth embodiment above, since the spring module is disposed at an intermediate portion of the pile of fuel cells in a fuel cell piling direction, inclination and fluctuation of the thickness of each fuel cell can be released at the intermediate portion of the pile of fuel cells before they are summed over an entire length of the pile of fuel cells.

In the fuel cell stack according to the ninth embodiment above, since the first member and the second member are electrically connected to each other by an electrically conductive member other than the plurality of springs, the spring characteristic and the electrical conductivity are maintained independent of each other and respectively good.

In the fuel cell stack according to the tenth embodiment above, since the spring module is disposed at each of the opposite ends of the fuel cell stack in a fuel cell piling direction, when an impact load acts on the fuel cell stack and a first spring module located at a first end of the fuel cell stack is shrunk, a second spring module located at a second, opposite end of the fuel cell stack is temporarily expanded whereby the fastening load acting on the fuel cell stack is prevented from being temporarily decreased.

In the fuel cell stack according to the eleventh or twelfth embodiment above, since the spring module includes a shock absorber, even if an impact load acts on the fuel cell stack to operate to shrink the spring module, the shock absorber operates as if it were rigid against deformation of a high speed whereby the fastening load of the fuel cell stack is prevented from being temporarily loosened. Against deformation of a low speed such as a thermal deformation, the shock absorber can be deformed smoothly, generating little mechanical resistance.

In the fuel cell stack according to the thirteenth or fourteenth embodiment above, since the spring module includes a plurality of types of resilient members having moduli of elasticity different from each other, even if the fastening load loaded on the pile of fuel cells by one type of resilient members is lost, the fastening load loaded on the pile of fuel cells is maintained by the other type of resilient members.

In the fuel cell stack according to the fifteenth or sixteenth embodiment above, since one type of resilient members hold another type of resilient members or the plurality of types of resilient members comprises resilient members formed integrally with each other, it is easy to mount the spring module to the fuel cell stack.

In the fuel cell stack according to the seventeenth embodiment above, since one type of resilient members among the plurality of types of resilient members has a spring constant changing in magnitude corresponding to a speed of deformation and a spring constant corresponding to a high speed of deformation is greater than a spring constant corresponding to a slow speed of deformation, the one type of resilient members becomes rigid against a high speed of deformation, whereby loss of a fastening load loaded on the fastened object (the pile of fuel cells) is prevented.

In the fuel cell stack according to the eighteenth embodiment above, since the plurality of types of resilient members includes a spring type and a low-resilience sponge type, the low-resilience sponge becomes rigid against a high speed of deformation, whereby loss of a fastening load on the biased object (the fuel cell) is prevented.

In the fuel cell stack according to the nineteenth embodiment above, since the spring module presents a load versus deformation characteristic bending at an intermediate deformation point in a full deformation range, the one type of resilient members becomes rigid against a high speed of deformation, whereby loss of a fastening load loaded on the fastened object (the pile of fuel cells) is prevented.

In the fuel cell stack according to the twentieth embodiment above, since the spring module has a low spring constant and the spring module is precompressed or is used at a large deformation range, loss of a fastening load loaded on the fastened object (the pile of fuel cells) is prevented.

In the fuel cell stack according to the twenty-first embodiment above, since the resilient member and the first and second members are made from corrosion-resistant materials, rust which will be generated affected by water drops caused by a change in temperature will be suppressed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which.

DESCRIPTION OF THE PREFERRED EMBODIMENTS

Figure 1:
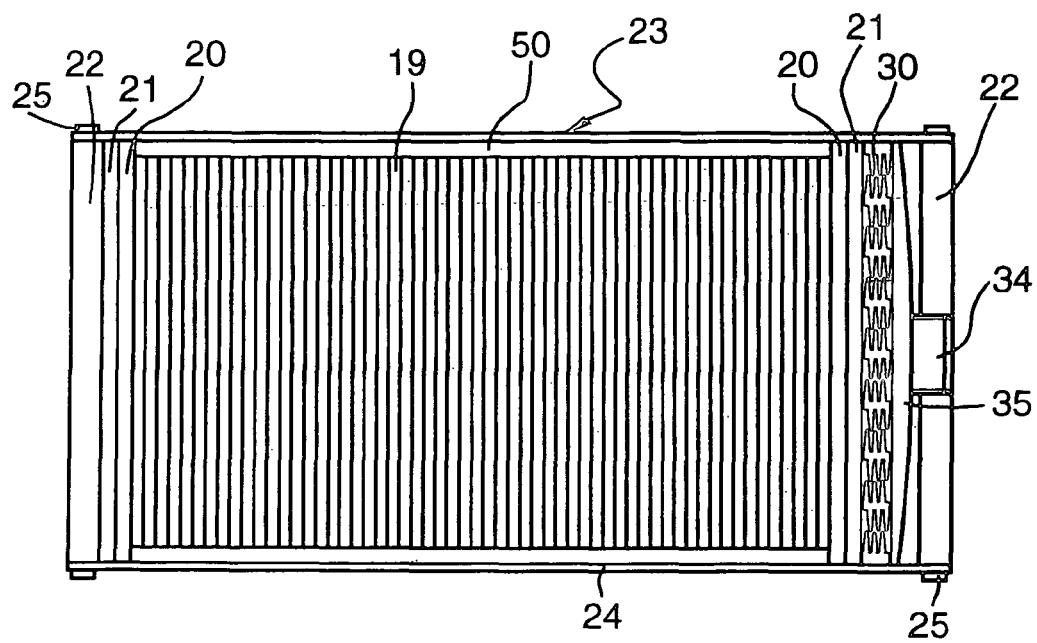
FIG. 1 is a side elevational view of a fuel cell stack according to the present invention.
Figure 2:
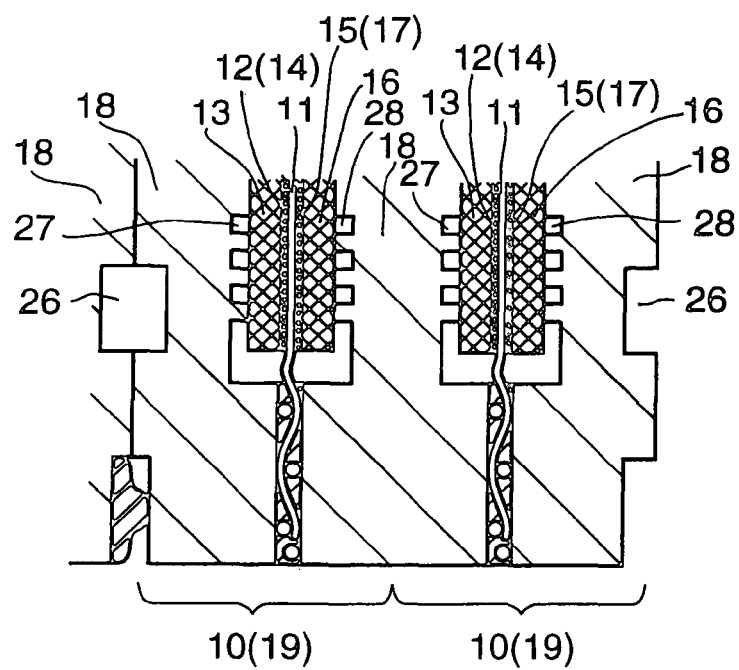
FIG. 2 is an enlarged cross-sectional view of one portion of the fuel cell stack of FIG. 1.
Figure 3:
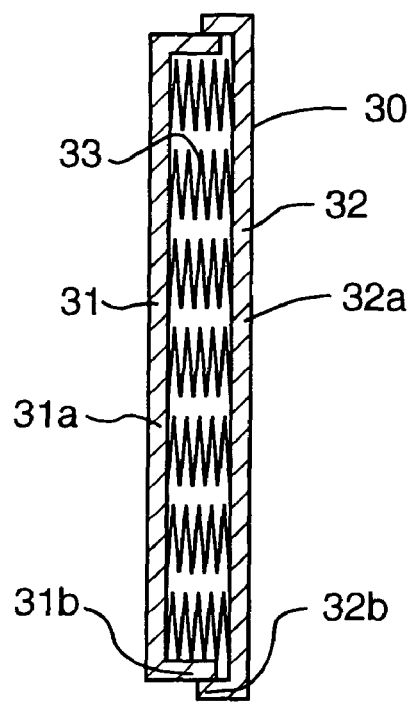
FIG. 3 is a cross-sectional view of a spring module of a fuel cell stack according to a first embodiment of the present invention.

A fuel cell stack according to the present invention will be explained with reference to FIGS. 1-20. FIGS. 1-3 are applicable to all embodiments of the present invention. Portions common to or similar throughout all embodiments of the present invention are denoted with the same reference numerals throughout all of the description and illustrations of the embodiments of the present invention. FIG. 20 illustrates a comparison example which is not included within the scope of the present invention.

The portions common to or similar throughout all embodiments of the present invention will now be explained with reference to FIGS. 1-3.

A fuel cell 10 of a fuel cell stack of the present invention is of a low-temperature type, for example, a Polymer Electrolyte Fuel Cell (PEFC) type. The fuel cell 10 can be mounted to a vehicle, for example, but is not limited to use with a vehicle in any way.

As illustrated in FIGS. 1 and 2, the PEFC 10 includes a layer of a membrane-electrode assembly (MEA) and a separator 18. The MEA includes an electrolyte membrane 11 of an ion-exchange membrane, an electrode 14 (an anode, a fuel electrode) including a catalyst layer 12 disposed on one side of the membrane 11, and an electrode 17 (a cathode, an air electrode) including a catalyst layer 15 disposed on the other side of the membrane 11. Diffusion layers 13 and 16 may be disposed between the MEA and the separators on the anode side and the cathode side, respectively. In the separators 18, a fuel gas passages 27 for supplying fuel gas (e.g., hydrogen) to the anode and an oxidant gas passage 28 for supplying oxidant gas (e.g., oxygen, usually, air) to the cathode are formed in the separators 18, and/or a coolant passage 26 for letting coolant (e.g., cooling water) flow is formed in the separators 18. At least one fuel cell 10 forms a fuel cell module 19. A plurality of fuel cell modules are piled in a fuel cell piling direction to form a pile of fuel cells and electrical terminals 20, electrical insulators 21, and end plates 22 are disposed at opposite ends of the pile of fuel cells. The end plates 22 are coupled to a fastening member (for example, a tension plate 24) extending in the fuel cell piling direction outside the pile of fuel cells by bolts 25 and/or nuts, thereby forming a fuel cell stack 23. The pile of fuel cells is tightened in the fuel cell piling direction. The fuel cell stack 23 may be directed in any direction, that is, it may be directed in a vertical direction or in a horizontal direction. The pile of fuel cells is restricted from side surfaces thereof by an outside restricting member 50 which is made from, for example, a sponge.

On the anode 14 of each fuel cell 10, there occurs a reaction whereby hydrogen changes to hydrogen ions (i.e., protons) and electrons. The hydrogen ions move through the electrolyte membrane 11 to the cathode 17 where the hydrogen ions react with oxygen supplied and electrons (which are generated at an anode of an adjacent MEA and move to the cathode of the instant MEA through a separator 18) to form water as follows:

At the anode: 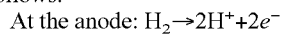
At the cathode: 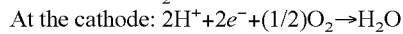

When the pile of fuel cells is tightened, the fuel cell stack 23 is given a fastening load to decrease an electrical contact resistance of the electrodes and seal the reactant gas and coolant. The fastening load must be uniform over an entire range of a fuel cell plane and may not substantially change in magnitude even if the pile of fuel cells is shrunk or elongated in the fuel cell piling direction.

In order to satisfy the above requirement, in the fuel cell 10 of the present invention, as illustrated in FIG. 1, a spring module 30 (which may also be called an elastically deformable module) is disposed in the fuel cell stack 23 including the pile of fuel cells so as to be in series with the pile of fuel cells in the fuel cell piling direction. As illustrated in FIG. 3, the spring module 30 includes a first member 31 and a second member 32 which can be inclined relative to each other and may move in a direction toward and away from each other, and a plurality of springs 33 (resilient members) independent of each other which are arranged in parallel or in series with each other.

The spring (resilient member) 33 may be a metal spring or a spring made from materials other than metal. The spring 33 may be a coil spring, a coned disk spring, or a member made from elastic material, for example, sponge, low-resilient sponge, rubber, elastic synthetic resin, etc. The plurality of springs 33 may comprise one type of springs or a plurality of types of springs. The plurality of springs 33 may have a common, single spring constant or a plurality of different spring constants. Each spring 33 can be a metal coil spring or a combination of a metal coil spring and a low-resilience sponge, for example, but the springs 33 are not limited to those examples in any way. The number of the springs 33 is preferably five or more, more preferably ten or more, and even more preferably about sixty per spring module.

The spring module 30 can advantageously be made in the form of a unit (module) before the spring module 30 is mounted to the fuel cell stack 23. Therefore, the first member 31, the second member 32, and the springs 33 are handled and managed as a single unit (module) and are mounted to a predetermined position or predetermined positions of the fuel cell stack 23. The predetermined position or predetermined positions of the fuel cell stack 23 may be one end of the pile of fuel cells, opposite ends of the pile of fuel cells, or an intermediate position of the pile of fuel cell located between the opposite ends. The number of spring modules provided per fuel cell stack may be one, two, or more than two.

Preferably, walls perpendicular to the fuel cell piling direction of the first member 31 and the second member 32 of the spring module 30 have a rigidity such that the walls are deformed so as to be convex and/or concave in the fuel cell piling direction and to be wavy when the walls receive loads from the plurality of springs 33 independent of each other. Preferably, the walls perpendicular to the fuel cell piling direction of the first member 31 and the second member 32 are not a rigid plate, but a deformable plate which can elastically be deformed to be convex and/or concave in the fuel cell piling direction and to be wavy.

In FIG. 1, the spring module 30 is disposed between the end plate 22 located at one end of the fuel cell stack 23 and the pile of fuel cells. Between the spring module 30 and the end plate 22, a position adjust screw 34 is provided. Therefore, in a direction from the end plate 22 to the pile of fuel cells, the end plate 22, the adjust screw 34, a pressure plate 35, the spring module 30, the electrical insulator 21, the electrical terminal 20, and the pile of fuel cells are arranged in that order. However, the arrangement order of the spring module 30, the electrical insulator 21, the electrical terminal 20, and the pile of fuel cells may be instead ordered as the electrical insulator 21, the electrical terminal 20, the spring module 30, and the pile of fuel cells, or as the electrical insulator 21, the spring module 30, the electrical terminal 20, and the pile of fuel cells.

Effects and technical advantages of the above-described portions common to or similar throughout all of the embodiments of the present invention will be explained.

In the fuel cell 10 of the present invention, since the plurality of springs 33 can be deformed independently of each other and the first member 31 and the second member 32 of the spring module 30 are not a rigid plate, the plurality of springs 33 can follow not only an inclination of an end surface and a wavy deformation of the inclined end surface of the pile of fuel cells, but also a change of a length (a shrinkage or an expansion) of the pile of fuel cells in the fuel cell piling direction. As a result, the fastening load is made uniform over an entire range of the fuel cell plane. Further, alteration of the load in the fuel cell piling direction can be decreased.

More particularly, in the comparison example of FIG. 20, the structure including the end plate 22, adjust screw 34, the spherical seat member 36, the load cell 37, the plurality of coned disk springs 38, and the pressure plate 35 follows an inclination of the end surface of the pile of fuel cells. However, since the pressure plate 35 is a rigid plate, the pressure plate 35 cannot follow a wavy deformation of the end surface of the pile of fuel cells which is deformed to be convex and concave in the fuel cell piling direction, so that the pressure plate 35 cannot solve the problem of fluctuation of the load due to that wavy deformation. In contrast, in the present invention, since the plurality of springs 33 can follow not only an inclination of an end surface, but also a wavy deformation of the inclined end surface of the pile of fuel cells, the fastening load is made uniform over an entire range of the fuel cell plane.

Since the plurality of springs 33 are assembled in one unit (one module), it is easy to handle the spring module 30, to manage the load, and to mount the spring module 30 to the predetermined position of the fuel cell stack 23.

Further, compared with the structure of the comparison example illustrated in FIG. 20 wherein the layered assembly of the plurality of coned disk springs, the spherical seat member containing the load cell, and the adjust screw are disposed between the end plate and the pile of fuel cells, in the present invention, the spherical seat member containing the load cell and the layered assembly of the plurality of coned disk springs can be removed. In the comparison example, since layering of the plurality of coned disk springs and managing of the load are conducted during assembly of the fuel cell stack, the work is difficult. In contrast, in the present invention, due to the spring module 30, it is possible to assemble the fuel cell stack and to manage the load before assembling the fuel cell stack, and the work is much easier than that of the comparison example.

Further, when the number of the springs 33 is large, the fastening load can be more uniform over the entire range of the fuel cell plane. More particularly, when the number of the springs is about sixty, the fastening load becomes substantially uniform over the entire range of the fuel cell plane, and the bearing load of each spring 33 becomes small. As a result, a length of each spring 33 becomes short, and the spring module 30 becomes short in an axial direction and compact.

Further, in the case where the spring module 30 is disposed at the intermediate portion of the pile of fuel cells in a fuel cell piling direction, inclination and fluctuation of thickness of each fuel cell can be released at the intermediate portion of the pile of fuel cells before they are summed over the entire length of the pile of fuel cells.

Next, structures and technical advantages thereof unique to each embodiment of the present invention will be explained.

With the first embodiment of the present invention, as illustrated in FIG. 3, in the spring module 30, the first member 31 is constructed from a first casing (since the first casing is the same member as the first member 31, a reference numeral of the first casing is selected to be 31), and the second member 32 is constructed from a second casing (since the second casing is the same member as the second member 32, a reference numeral of the second casing is selected to be 32). Due to this structure, the spring module 30 is a casing assembly (configured in the form of a box) which houses the plurality of springs.

The first casing 31 and the second casing 32 have bottom walls 31a and 32a parallel to the fuel cell plane and side walls 31b and 32b which extend toward the opposing casing 32 and 31 from outer peripheral portions of the bottom walls 31a and 32a. The springs 33 are disposed in a space enclosed by the first casing 31 and the second casing 32.

The first embodiment is technically advantageous since the spring module 30 is formed in the form of a casing assembly and the spring module 30 can thus be assembled in the fuel cell stack 23 by the form of a single assembly so that it is easy to mount the spring module 30 to the fuel cell stack 23. Further, since the load management is conducted at the spring module 30, the load management is easy compared with a case where each of the plurality of springs is managed.

Figure 4:
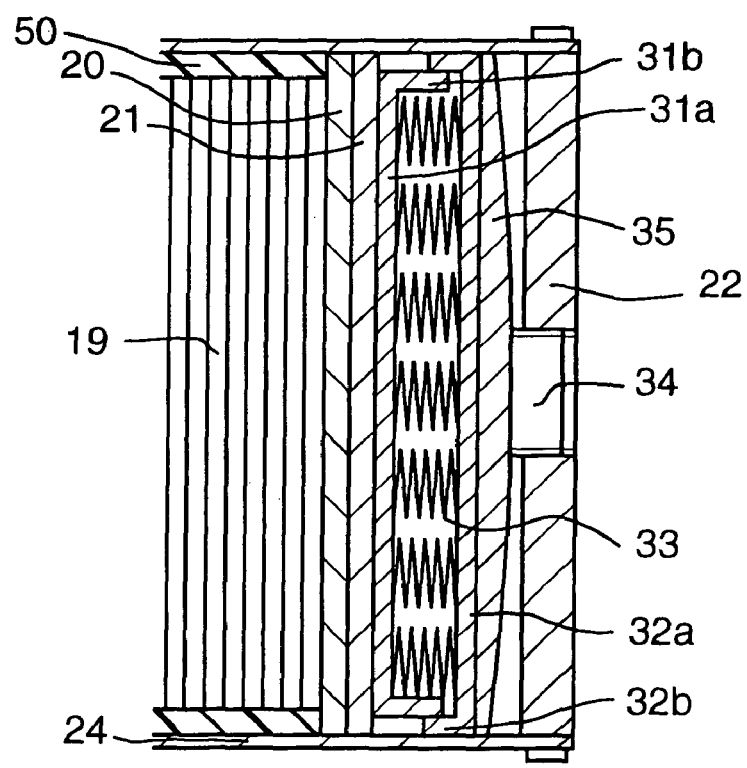
FIG. 4 is a cross-sectional view of a spring module and a vicinity thereof of a fuel cell stack according to a second embodiment of the present invention.

With the second embodiment of the present invention, as illustrated in FIG. 4, in the spring module 30, the walls perpendicular to the fuel cell piling direction (the bottom walls 31a and 32a) of the first casing 31 and the second casing 32 (especially, the bottom wall 31a of a casing 31 among the first and second casings 31 and 32 located closer to the pile of fuel cells) have such a rigidity that when the walls are pushed by the plurality of springs 33 independent of each other, the walls are deformed to be convex or concave in the fuel cell piling direction and are deformed in a form of a wave. The bottom walls are not a rigid plate, but a plate elastically deformable in a wavy form by being deformed convex and/or concave in the fuel cell piling direction.

The second embodiment is technically advantageous since when the flat plane perpendicular to the fuel cell piling direction of the member contacting the spring module 30 is inclined from a plane perpendicular to the fuel cell piling direction, the first casing 31 and the second casing 32 are inclined relative to each other so that the spring module 30 can follow the inclination of the flat plane of the member contacting the spring module. Further, even when the flat plane perpendicular to the fuel cell piling direction of the member contacting the spring module 30 is deformed to convex and/or concave in the fuel cell piling direction and to be wavy, from the flat plane perpendicular to the fuel cell piling direction or the inclined flat plane, the spring module 30 can follow the wavy deformation of the plane of the member contacting the spring module 30 by a wavy deformation of at least one of the bottom walls of the first and the second casings 31 and 32. As a result, the fastening load can be more uniform over the entire range of the fuel cell plane than in a case where a fastening load is loaded on the pile of fuel cells through a rigid plate.

Figure 5:
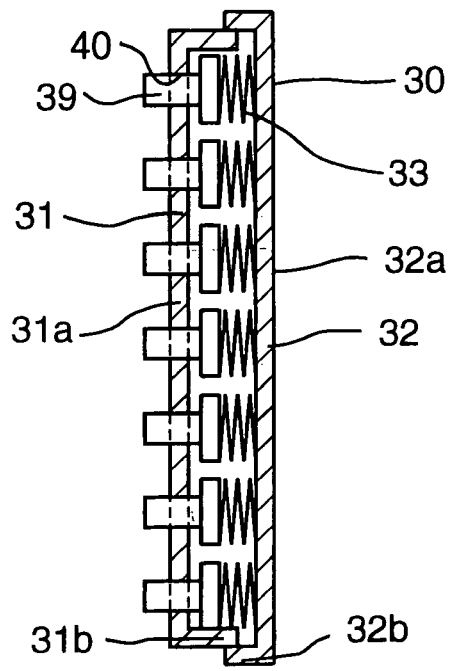
FIG. 5 is a cross-sectional view of a spring module of a fuel cell stack according to a third embodiment of the present invention.

With the third embodiment of the present invention, as illustrated in FIG. 5, the spring module 30 includes a plurality of spring seat members 39. For example, the number of the spring seat members 39 is the same as that of the plurality of springs 33. Each of the plurality of spring seat members 39 has a first end portion (opposite a second end portion where the spring seat member 39 contacts the spring 33) which extends through an aperture 40 formed in the bottom wall 31a of the casing 31 among the first casing 31 and the second casing 32, located closer to the pile of fuel cells and contacts a member contacting the bottom wall 31a of the casing 31.

Because the springs 33 are independent of each other, forces of the spring seat members 39 pushing the member contacting the spring module 30 are independent of each other, and protruding amounts of the end portions of the spring seat members protruding from the bottom wall of the casing are independent of each other.

The third embodiment is technically advantageous since the end portion of the spring seat member 39 extends through the aperture 40 formed in the bottom wall 31a of the casing 31, and the spring 33 can thus follow the wavy, convex and concave deformation of the end surface of the member which plane-to-plane contacts the spring module 30 without being affected the rigidity of the bottom wall 31a of the casing, so that the fastening load is made uniform over the entire range of the fuel cell plane.

Figure 6:
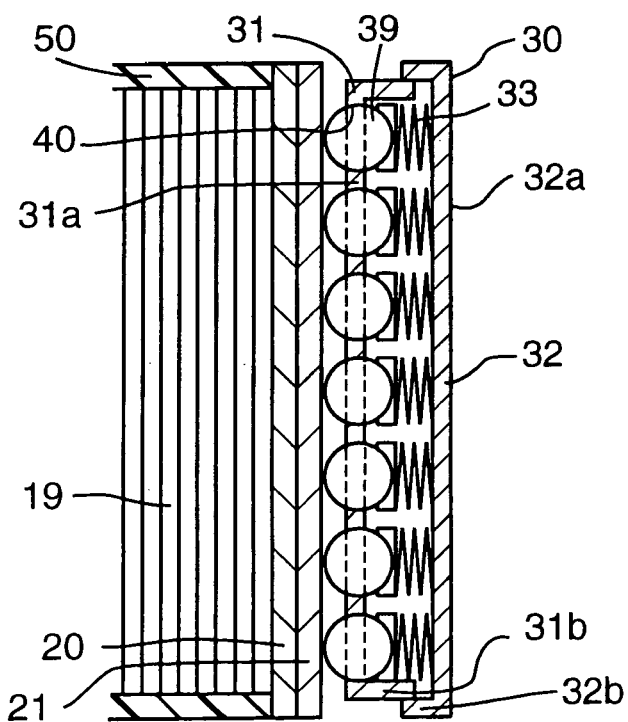
FIG. 6 is a cross-sectional view of a spring module and a vicinity thereof of a fuel cell stack according to a fourth embodiment of the present invention.

With the fourth embodiment of the present invention, as illustrated in FIG. 6, the spring module 30 includes a plurality of spring seat members 39. For example, the number of the spring seat members 39 is the same as that of the plurality of springs 33. Each of the plurality of spring seat members 39 has a first end portion (opposite a second end portion where the spring seat member 39 contacts the spring 33) which extends through an aperture 40 formed in the bottom wall 31a of the casing 31 among the first casing 31 and the second casing 32, located closer to the pile of fuel cells and contacts a member contacting the bottom wall 31a of the casing 31. Because the springs 33 are independent of each other, forces of the spring seat members 39 pushing the member contacting the spring module 30 are independent of each other, and protruding amounts of the end portions of the spring seat members protruding from the bottom wall of the casing are independent of each other.

The first end portion (opposite the second end portion where the spring seat member 39 contacts the spring 33) of each spring seat member 39 has an end surface which is convexly curved. For example, the spring seat member 39 is constructed from a ball so that the spring seat member 39 has a spherical end surface.

The fourth embodiment is technically advantageous since the end portion of the spring seat member 39 extends through the aperture 40 formed in the bottom wall 31a of the casing 31, and the spring 33 can thus follow the wavy, convex and concave deformation of the end surface of the member which plane-to-plane contacts the spring module 30 without being affected the rigidity of the bottom wall 31a of the casing, so that the fastening load is made uniform over the entire range of the fuel cell plane.

Further, since the end surface of the spring seat member 39 is convexly curved, for example, by constructing the spring seat member from a ball, even if a transverse load (a load directed in a direction perpendicular to the fuel cell piling direction) is loaded on the spring module from the member which contacts the spring module 30 plane-to-plane, the spring seat 39 can easily release the transverse load by its rotating. Furthermore, by constructing a protrusion protruding from the bottom wall of the casing by a ball, the spring seat member 39 can point-contact the member which contacts the spring module 30 plane-to-plane, so that an in-plane strain occurring in a plane-to-plane contact can be removed. As a result, the fastening load is made further uniform over the entire range of the fuel cell plane.

Figure 7:
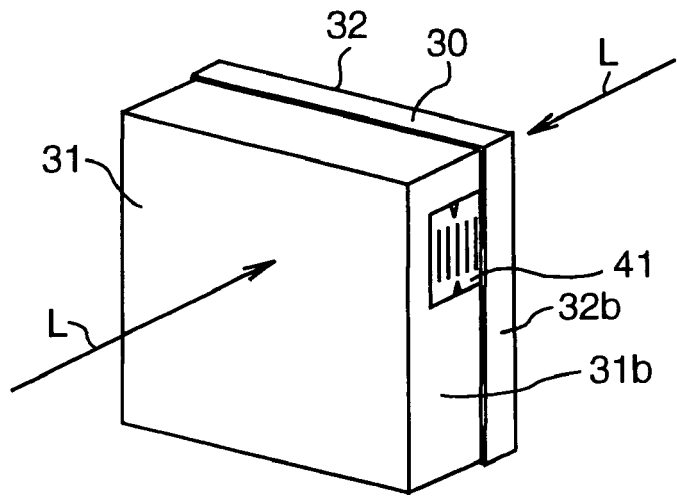
FIG. 7 is a perspective view of a spring module of a fuel cell stack according to a fifth embodiment of the present invention.

With the fifth embodiment of the present invention, as illustrated in FIG. 7, the first casing 31 of the spring module 30 has a side wall 31b and the second casing 32 of the spring module 30 has a side wall 32b. In the side walls 31b and 32b, a load expressing portion 41 is provided. The load expressing portion 41 is a mechanical load sensor. When the mechanical load sensor includes a coil spring, the load versus deformation characteristic is linear. Adjustment of load L is conducted beforehand.

The fifth embodiment is technically advantageous since the load expressing portion 41 is provided in the side walls 31b and 32b of the casings 31 and 32, and it is thus unnecessary in the present invention to provide the load cell of the comparison example of FIG. 20.

Figure 8:
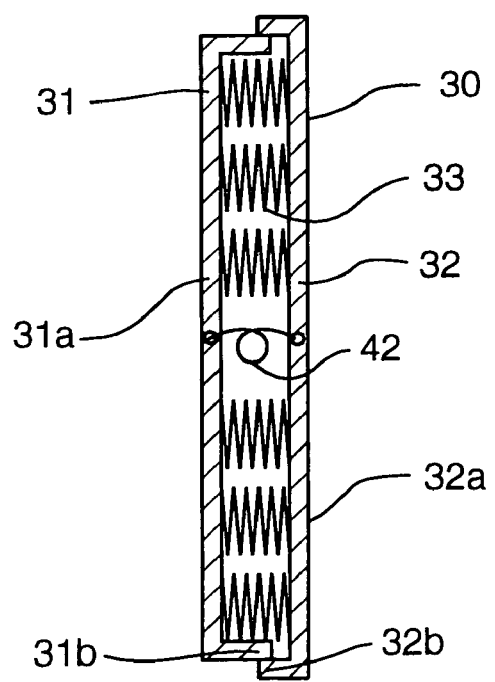
FIG. 8 is a cross-sectional view of a spring module of a fuel cell stack according to a sixth embodiment of the present invention.

With the sixth embodiment of the present invention, as illustrated in FIG. 8, the first member 31 (for example, the first casing 31) and the second member 32 (for example, the second casing 32) are electrically connected to each other by an electrically conductive member 42 other than the plurality of springs 33.

In this case, the spring module 30 may be disposed at an intermediate portion of the pile of fuel cells in a fuel cell piling direction in which the fuel cells are piled, or the spring module 30 may be disposed between the end surface of the pile of fuel cells and the electrical terminal 20.

The sixth embodiment is technically advantageous since the first member 31 (for example, the first casing 31) and the second member 32 (for example, the second casing 32) are electrically connected to each other by the electrically conductive member 42 other than the plurality of springs 33, and the spring characteristic and the electrical conductivity are thus maintained respectively good. Due to this structure, even when the spring module 30 is disposed at an intermediate portion of the pile of fuel cells in a fuel cell piling direction in which the fuel cells are piled, or the spring module 30 is disposed between the end surface of the pile of fuel cells and the electrical terminal 20, no conductive problem occurs.

When the spring module 30 is disposed at an intermediate portion of the pile of fuel cells, inclination and fluctuation of thickness of each fuel cell can be released at the intermediate portion of the pile of fuel cells before they are summed over the entire length of the pile of fuel cells.

Figure 9:
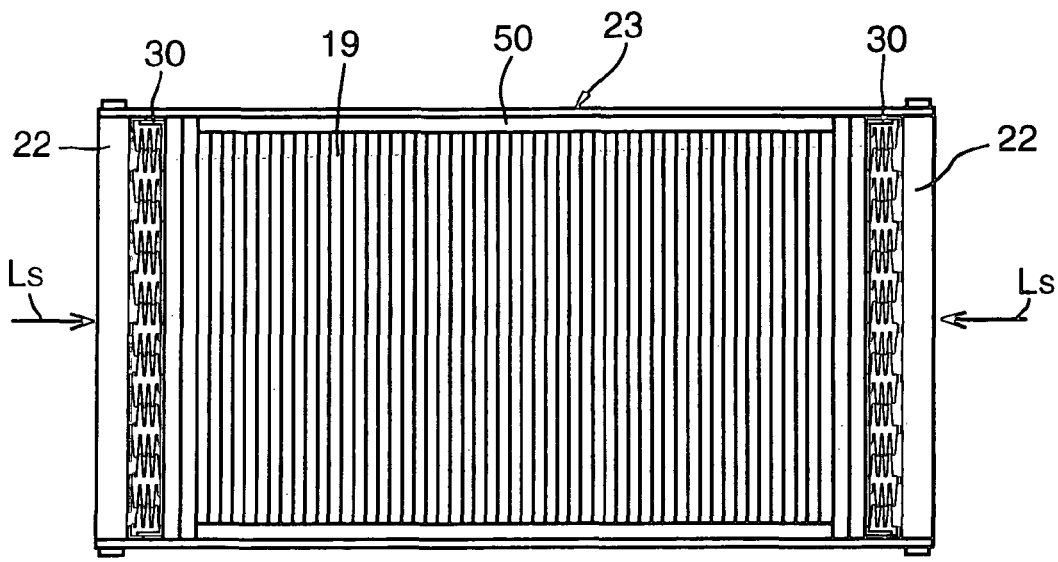
FIG. 9 is a side elevational view of a fuel cell stack according to a seventh embodiment of the present invention.

With the seventh embodiment of the present invention, as illustrated in FIG. 9, the spring module 30 is disposed at each of opposite ends of the fuel cell stack 23 in the fuel cell piling direction in which the fuel cells are piled (for example, inside the end plate 22 of the fuel cell stack).

The seventh embodiment is technically advantageous since the spring module 30 is disposed at each of the opposite ends of the fuel cell stack 23 in the fuel cell piling direction, and thus when an impact load Ls temporarily acts on the fuel cell stack 23 and a first spring module 30 located at a first end of the fuel cell stack 23 is shrunk, a second spring module 30 located at a second, opposite end of the fuel cell stack 23 is temporarily expanded whereby the fastening load acting on the fuel cell stack 23 is prevented from being temporarily lost.

Figure 10:
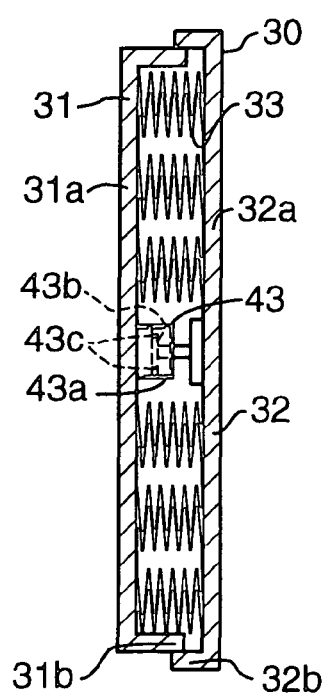
FIG. 10 is a cross-sectional view of a spring module of a fuel cell stack according to an eighth embodiment of the present invention.

With the eighth embodiment of the present invention, as illustrated in FIG. 10, the spring module 30 further includes a shock absorber 43 located between the first member 31 (the first casing 31) and the second member 32 (the second casing 32). The shock absorber 43 is located at a central portion of the first member 31 and the second member 32. The shock absorber 43 includes a cylinder 43a and a piston 43b where a small aperture 43c formed in the piston 43b. The cylinder 43a is filled with oil.

The eighth embodiment is technically advantageous because when the piston 43b moves at a high speed, the resistance of the oil passing through the aperture 43c becomes large. As a result, when a shock load acts on the pile of fuel cells, the shock absorber 43 operates as if it were rigid and suppresses movement of the pile of fuel cells whereby the fastening load of the fuel cell stack is prevented from being temporarily lost. Contrarily, when the piston 43b moves at a low speed, the resistance of the oil passing through the aperture 43c becomes small. As a result, against a piston movement at a low speed such as a thermal expansion and shrinkage, the shock absorber 43 can be deformed without resistance, whereby the shock absorber 23 can follow the thermal expansion and shrinkage without loosening the fastening load of the fuel cell stack.

Figure 11:
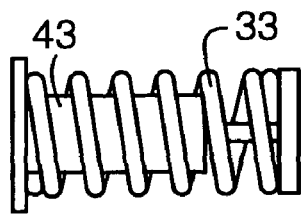
FIG. 11 is a side elevational view of one spring and one shock absorber of a spring module of a fuel cell stack according to a ninth embodiment of the present invention.

With the ninth embodiment of the present invention, the spring module 30 includes a plurality of shock absorbers 43, for example, the same number of shock absorbers 43 as the number of the springs 33. As illustrated in FIG. 11, each of the plurality of shock absorbers 43 and each of the plurality of springs 33 are coaxially arranged with each other.

The ninth embodiment has the same technical advantages as those of the eighth embodiment. In addition, when compared with the eighth embodiment, since the spring 33 and the shock absorber 43 are coaxially arranged in the ninth embodiment, each shock absorber 43 can be disposed at the position of each spring 33, and a space required for disposing the springs 33 and the shock absorbers 43 therein can be minimized.

Figure 12:
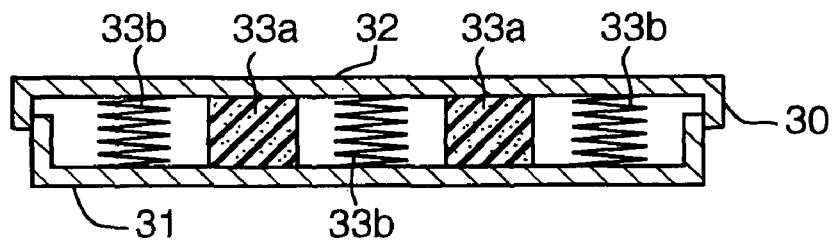
FIG. 12 is a cross-sectional view of a spring module of a fuel cell stack according to a tenth embodiment of the present invention.
Figure 13:
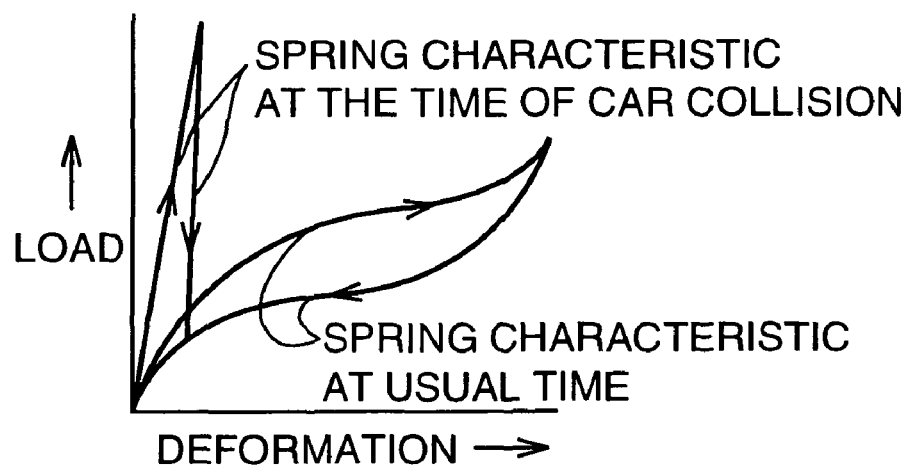
FIG. 13 is a graph illustrating a load versus deformation characteristic of the spring module of the fuel cell stack according to the tenth embodiment of the present invention.

With the tenth embodiment of the present invention, as illustrated in FIGS. 12 and 13, the spring module 30 includes a plurality of types of resilient members 33a and 33b having moduli of elasticity different from each other. The number of resilient members of each type may be one, two or more.

The plurality of types of resilient members 33a and 33b are disposed parallel to each other. In FIG. 12, one type of resilient members 33a among the plurality of types of resilient members 33a and 33b is a sponge of a low-resilience type, and the other type of resilient members 33b is a metal coil spring. The sponge 33a of a low-resilience type is called as a sponge of a slow recovery type. The sponge 33a of a low-resilience type has a spring constant changing in magnitude corresponding to speed of deformation where a spring constant corresponding to a high speed of deformation is greater than a spring constant corresponding to a slow speed of deformation. FIG. 13 illustrates a load versus deformation characteristic of the sponge 33a of a low-resilience type. As illustrated in FIG. 13, the sponge 33a of a low-resilience type presents a characteristic of a high gradient where a load rises rapidly in a small deformation, for a deformation of a high speed which occurs at the time of a vehicle collision, to show a large and high spring constant. In contrast, for a usual deformation of a low speed, the sponge 33a of a low-resilience type presents a characteristic of a low gradient where a load rises slowly in a large deformation, to shown a small and low spring constant.

The tenth embodiment is technically advantageous since the spring module 30 includes a plurality of types of resilient members 33a and 33b having moduli of elasticity different from each other, so that even if the fastening load loaded on the pile of fuel cells by one type of resilient members 33a is lost, the fastening load loaded on the pile of fuel cells is maintained by the other type of resilient members 33b.

For a slow deformation of the fuel cell stack 23, the spring 33b is dominant. For a shock load, the sponge 33a bears the load, whereby the spring module can be prevented from being shrunk. More particularly, in the case where a spring module housing springs only therein is disposed only at one end of the fuel cell stack and the stack is mounted to a vehicle with that one end directed ahead of the vehicle, when the vehicle occurs a front collision, the spring module is shrunk whereby the fastening load of the fuel cell stack will be lost or decreased temporarily. However, in the tenth embodiment, since the spring module 30 houses the sponge 33a of a low-resilience type, the shrinkage of the spring module is prevented and the temporal loss of the fastening load is prevented.

Figure 14:
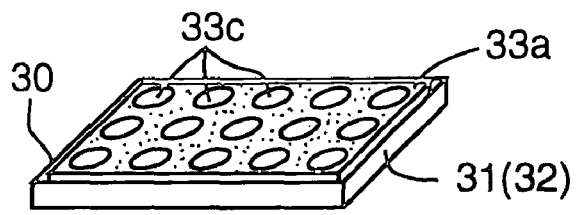
FIG. 14 is a perspective view of a spring module of a fuel cell stack according to an eleventh embodiment of the present invention.

With the eleventh embodiment of the present invention, as illustrated in FIG. 14, one type of resilient member 33a among the plurality of types of resilient members 33a and 33b holds the other type of resilient members 33b among the plurality of types of resilient members 33a and 33b.

For example, the one type of resilient member 33a is a sponge of a low-resilience type and the other type of resilient members 33b are a metal coil spring. The resilient member 33a of a low-resilience type is formed to be a single integral member, and in the single integral sponge 33a, the same number of holes 33c (each having a diameter equal to an outer diameter of the coil spring 33b) as the number of the coil springs 33b are formed. Each coil spring 33b is set in each hole 33.

The eleventh embodiment is technically advantageous since the one type of resilient member 33a holds the other type of resilient member 33b, and thus mounting the springs 33 to the casing of the spring module 30 and mounting the spring module 30 to the fuel cell stack 23 are easy tasks compared with a case where cut and bent portions are formed in a casing and springs are set to the cut and bent portions.

Figure 15:
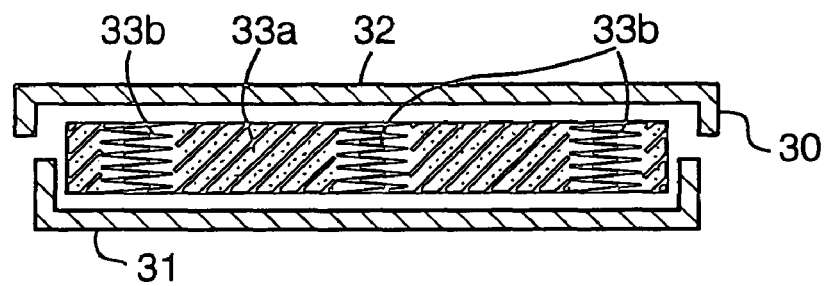
FIG. 15 is a perspective view of a spring module of a fuel cell stack according to a twelfth embodiment of the present invention.

With the twelfth embodiment of the present invention, as illustrated in FIG. 15, the plurality of types of resilient members 33a and 33b are formed so as to be integral with each other.

For example, one type of resilient member 33a is a sponge of a low-resilience type and the other type of resilient members 33b are a metal coil spring. The coil springs 33b are embedded in the sponge 33a of a low-resilience type so as to be integral with the sponge 33a.

The twelfth embodiment is technically advantageous since the coil springs 33b are embedded in the sponge 33a of a low-resilience type so as to be integral with the sponge 33a, and thus mounting the integral assembly of the springs 33b and the sponge 33a to the casing of the spring module 30 and mounting the spring module 30 to the fuel cell stack 23 are easy tasks.

Further, since the sponge 33a can be inserted even into a space inside the spring 33b, the area where the sponge 33a is disposed can be increased. As a result, the effect due to the sponge 33a can be increased.

Figure 16:
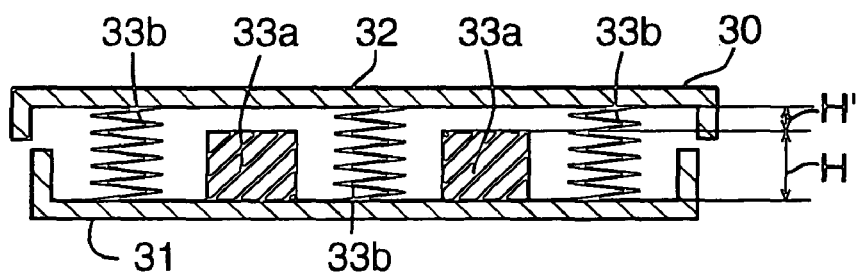
FIG. 16 is a cross-sectional view of a spring module before a load is loaded, of a fuel cell stack according to a thirteenth embodiment of the present invention.
Figure 17:
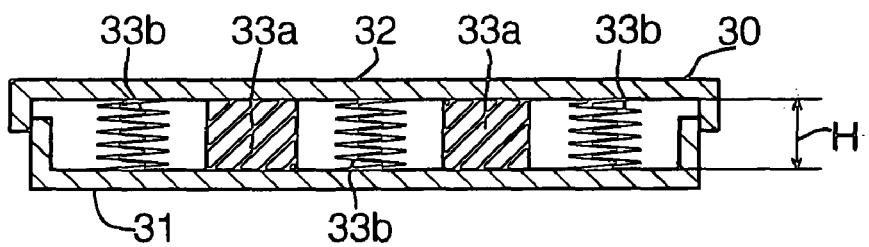
FIG. 17 is a cross-sectional view of the spring module after a load has been loaded, of the fuel cell stack according to the thirteenth embodiment of the present invention.
Figure 18:
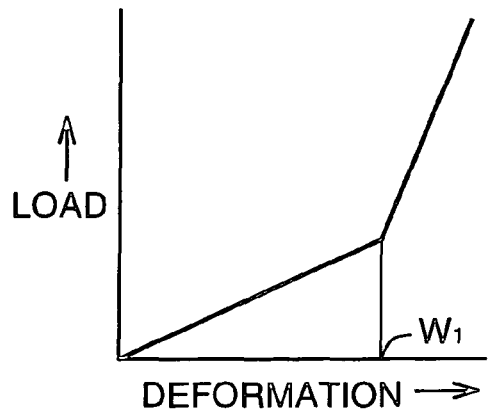
FIG. 18 is a graph illustrating a load versus deformation characteristic of the spring module of the fuel cell stack according to the thirteenth embodiment of the present invention.

With the thirteenth embodiment of the present invention, as illustrated in FIGS. 16-18, the plurality of types of resilient members 33a and 33b are combined such that the spring module 30 presents a load versus deformation characteristic bending at an intermediate deformation point $W_1$ in a full deformation range W.

In FIGS. 16 and 17, one type of resilient member 33a and the other type of resilient member 33b are arranged in parallel with each other. A length H of the resilient member 33a in a free, not-compressed state is not equal to a space (H+H') between the first and second casings, and the length H is shorter than the space (H+H') by H'. When the load is zero, there is a space of H' between the spring casing and the resilient member 33a. When a load is loaded on the first and second casings and the space (H+H') between the first and second casings becomes short by the amount of H', the resilient member 33a begins to receive a load. The load versus deformation characteristic is shown in FIG. 18. The one type of resilient members 33a and the other type of resilient members 33b are combined such that up to a predetermined deformation of the spring module, the one type of resilient members 33b only are deformed, and above the predetermined deformation of the spring module, both types of resilient members 33a and 33b are deformed, whereby the load versus deformation characteristic of FIG. 18 is obtained. In the characteristic, the spring module presents a low spring constant up to the predetermined deformation of the spring module, and presents a high spring constant above the predetermined deformation of the spring constant. According to a required characteristic, combination of the types of springs may be changed.

Figure 19:
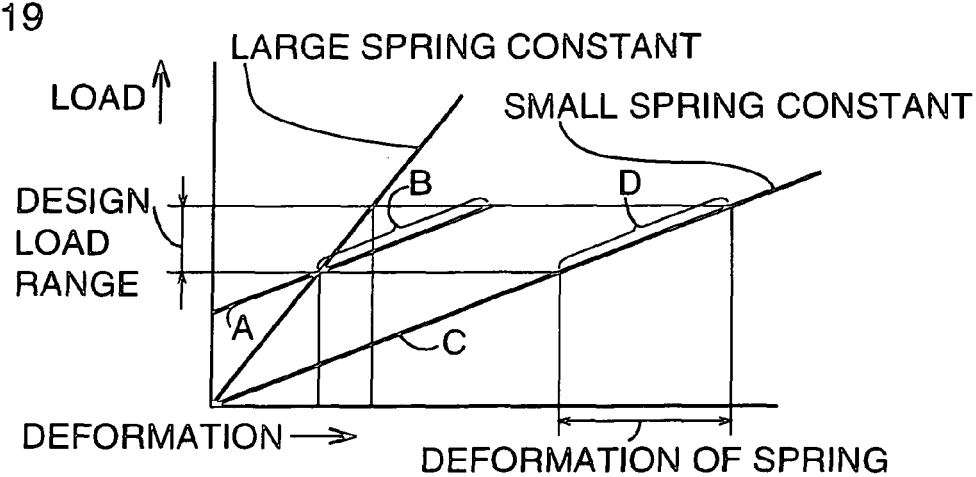
FIG. 19 is a graph illustrating a load versus deformation characteristic of a spring module of a fuel cell stack according to a fourteenth embodiment of the present invention.
Figure 20:
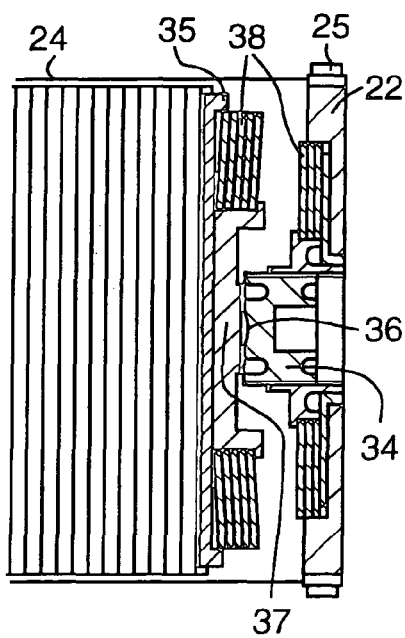
FIG. 20 is a cross-sectional view of an end portion of a fuel cell stack of a comparison example.

With the fourteenth embodiment of the present invention, as illustrated in FIG. 19, a synthetic spring constant of the plurality of resilient members 33 of the spring module 30 is set to be low, and the spring module 30 is used in a precompressed state or at a large deformation range. When the synthetic spring constant of the spring module 30 is set low and the spring module 30 is used in a precompressed state, the spring module is used at a use range B on line A of FIG. 19. When the synthetic spring constant of the spring module 30 is set low and the spring module 30 is used at a large deformation range, the spring module is used at a use range D on line C of FIG. 19.

The fourteenth embodiment is technically advantageous since, in the case where the spring module is precompressed, the temporal loss of the fastening load is prevented. Further, since the synthetic spring constant is set to be low, a large amount of dimensional fluctuations in the length of the pile of fuel cells can be absorbed in a predetermined load range.

With the fifteenth embodiment of the present invention, the resilient member 33 and the first and second members 31 and 32 are made from corrosion-resistant materials. The corrosion-resistant materials may include stainless steel and synthetic resin.

The fifteenth embodiment is technically advantageous since the corrosion-resistance level is set high, so that a bad influence on the fuel cell by a rust such as iron oxide can be avoided. Since the spring module 30 and the separator 18 spatially communicate with each other, iron oxide powder from the spring module may promote corrosion of the separator and metal ions may raise an electrical conductivity of the vicinity of the spring module. However, in the present invention, by suppressing generation of iron rust, the bad influence of the rust on the fuel cell can be removed.

INDUSTRIAL APPLICABILITY

The fuel cell stack according to the present invention is useful as a fuel cell stack which can follow not only an inclination of the end surface of the pile of fuel cells, but also a change of the length of the pile of fuel cells in the fuel cell piling direction.

Further, the fuel cell stack according to the present invention is useful as a fuel cell stack which can make a fastening load uniform over an entire range of the fuel cell plane and can decrease alteration of the load in the fuel cell piling direction.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

The invention claimed is:
1. A fuel cell stack comprising:
a pile of fuel cells; and
a spring module disposed in series with said pile of fuel cells, said spring module including:
a first member and a second member capable of inclining relative to each other and moving in a direction toward and away from each other; and
a plurality of springs independent of each other and disposed in parallel with each other between said first member and said second member, wherein:
said first member includes a first casing and said second member includes a second casing; and
said spring module includes a casing assembly housing said plurality of springs,
wherein a casing among said first and second casings located closer to said pile of fuel cells includes a bottom wall having a rigidity such that when said wall is pushed by said plurality of springs independent of each other, said wall is elastically deformable in a wavy form in a fuel cell piling direction in which said fuel cells are piled.
2. A fuel cell stack according to claim 1, wherein:
said fuel cell stack includes an end plate and an adjust screw;
said spring module is disposed between said end plate and said pile of fuel cells; and
said adjust screw is disposed between said spring module and said end plate.
3. A fuel cell stack according to claim 1, wherein:
said first and second casings of said spring module have a side wall where a load expressing portion is provided.
4. A fuel cell stack according to claim 1, wherein:
said spring module is disposed at an intermediate portion of said pile of fuel cells in a fuel cell piling direction in which said fuel cells are piled.
5. A fuel cell stack according to claim 4, wherein:
said first member and said second member are electrically connected to each other by an electrically conductive member other than said plurality of springs.
6. A fuel cell stack according to claim 1, wherein:
said spring module is disposed at each of opposite ends of said fuel cell stack in a fuel cell piling direction in which said fuel cells are piled.
7. A fuel cell stack according to claim 1, wherein:
said spring module further includes a shock absorber located between said first member and said second member.
8. A fuel cell stack according to claim 1, wherein:
said spring module further includes a plurality of shock absorbers; and
said plurality of shock absorbers and said plurality of springs are coaxially arranged with each other.
9. A fuel cell stack according to claim 1, wherein:
said spring module includes a plurality of types of resilient members having moduli of elasticity different from each other.
10. A fuel cell stack according to claim 9, wherein:
said plurality of types of resilient members are disposed parallel to each other.
11. A fuel cell stack according to claim 10, wherein:
said plurality of types of resilient members are formed so as to be integral with each other.
12. A fuel cell stack according to claim 9, wherein:
one type of resilient members among said plurality of types of resilient members holds another type of resilient members among said plurality of types of resilient members.
13. A fuel cell stack according to claim 9, wherein:
said plurality of types of resilient members are formed so as to be integral with each other.

14. A fuel cell stack according to claim 9, wherein:
one type of resilient members among said plurality of types of resilient members has a spring constant changing in magnitude corresponding to a speed of deformation; and
a spring constant corresponding to a high speed of deformation is greater than a spring constant corresponding to a slow speed of deformation.

15. A fuel cell stack according to claim 9, wherein:
said plurality of types of resilient members includes a spring and a sponge that has a lower resilience than the spring.

16. A fuel cell stack according to claim 9, wherein:
said plurality of types of resilient members comprises resilient members combined such that said spring module presents a load versus deformation characteristic bending at an intermediate deformation point in a full deformation range.

17. A fuel cell stack according to claim 9, wherein:
said spring module is precompressed or is used at a deformation range.

18. A fuel cell stack according to claim 1, wherein:
said resilient member and said first and second members are made from corrosion-resistant materials.

19. A fuel cell stack comprising:
a pile of fuel cells; and
a spring module disposed in series with said pile of fuel cells, said spring module including:
   a first member and a second member capable of inclining relative to each other and moving in a direction toward and away from each other; and
   a plurality of springs independent of each other and disposed in parallel with each other between said first member and said second member, wherein:
said first member includes a first casing and said second member includes a second casing; and
said spring module includes a casing assembly housing said plurality of springs wherein:
said spring module includes a plurality of spring seat members; and
each of said plurality of spring seat members has an end portion which extends through an aperture formed in said bottom wall of said casing located closer to said pile of fuel cells and contacts a member contacting said wall of said casing.

20. A fuel cell stack according to claim 19, wherein:
said end portion of each of said plurality of spring seat members has an end surface which is convexly curved.

* * * * *